(12) United States Patent  (10) Patent No.: US 7,397,018 B1
Pham et al.  (45) Date of Patent: Jul. 8, 2008

(54) AMPLITUDE AND PHASE CONTROLLED ADAPTIVE OPTICS SYSTEM

(75) Inventors: Ich V. Pham, San Jose, CA (US); Gopal Vasudevan, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 534 days.

(21) Appl. No.: 11/068,754

(22) Filed: Mar. 2, 2005

(51) Int. Cl.
*G01J 1/20* (2006.01)
(52) U.S. Cl. .............. 250/201.9; 398/118; 398/119; 398/192; 398/201; 359/279; 359/284; 359/286; 359/289; 359/290; 359/291; 359/298; 359/300; 359/318; 250/201.1; 250/201.2; 250/205
(58) Field of Classification Search ......... 398/118–131, 398/195, 201, 192; 250/200–201.9, 205; 372/29.023–31; 359/239, 279, 284, 290, 359/291, 286, 289, 298, 300, 318
See application file for complete search history.

(56) References Cited

U.S. PATENT DOCUMENTS

| | | | | |
|---|---|---|---|---|
| 4,271,355 A * | 6/1981 | Wisner et al. | ............ | 250/201.9 |
| 4,996,412 A * | 2/1991 | Anafi et al. | ............... | 250/201.9 |
| 5,745,309 A * | 4/1998 | Salmon | ..................... | 359/846 |
| 6,452,146 B1 * | 9/2002 | Barchers | .................. | 250/201.9 |
| 6,818,876 B1 * | 11/2004 | Pringle, Jr. | ............... | 250/201.9 |
| 7,041,953 B2 * | 5/2006 | Byren | ..................... | 250/201.9 |
| 7,113,707 B2 * | 9/2006 | Pepper | ...................... | 398/129 |
| 2004/0017603 A1 * | 1/2004 | Jay et al. | .................. | 359/341.4 |
| 2005/0135815 A1 * | 6/2005 | Gerwe et al. | ................. | 398/188 |
| 2005/0151960 A1 * | 7/2005 | Gerwe et al. | ................. | 356/121 |
| 2006/0158974 A1 * | 7/2006 | Kobayashi et al. | ........ | 369/44.32 |

OTHER PUBLICATIONS

Jeffrey D. Barchers "Closed-loop stable control of two deformable mirrors for compensation of amplitude and phase flucuations" by Opt.Soc. vol. 19, No. 5/May 2002.*
Michael et al. "Two-deformable-mirror concept for correcting scintillation effects in laser beam projection through the turbulent atmosphere" by Optical Society of America 1998.*

* cited by examiner

*Primary Examiner*—Kenneth Vanderpuye
*Assistant Examiner*—Phyowai Lin
(74) *Attorney, Agent, or Firm*—McDermott Will & Emery LLP

(57) ABSTRACT

An adaptive optics system is provided. The system includes a light source, a pair of deformable mirrors and a detection module. The light source is configured to provide an outgoing beam. The outgoing beam has an amplitude and a phase. The first deformable mirror is configured to reflect the outgoing beam and adjust its associated amplitude. The second deformable mirror is configured to reflect the outgoing beam reflected from the first deformable mirror and adjust its associated phase. The detection module is configured to detect an incoming beam and the reflected outgoing beam from the second deformable mirror and generate certain signals. The signals are used to control the first and second deformable mirrors such that the amplitude of the outgoing beam is the same as that of the incoming beam and the phase of the outgoing beam is opposite that of the incoming beam.

21 Claims, 9 Drawing Sheets

AMPLITUDE AND PHASE CONTROLLED ADAPTIVE OPTICS SYSTEM

CROSS-REFERENCE(S) TO RELATED APPLICATION(S)

Not Applicable.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

The present invention generally relates to methods and systems for providing adaptive optics, and in particular to methods and systems for providing adaptive optics using amplitude and phase.

Typical adaptive optics systems utilize deformable mirror (DM) actuators to compensate for the optical effects introduced by the turbulence in the Earth's atmosphere and distortions produced by the optical elements between the distant object and its local sensors. Such adaptive optics systems command the DM actuators while minimizing the measured wavefront phase error and set the DM actuators so that the outgoing laser's phase is opposite that of an incoming beacon. The disadvantage of the foregoing technique is that it does not work well in a strong turbulent or scintillation condition because the amplitude attenuation along the propagation path is not compensated.

One proposed system resolves the foregoing problem by using a dual-DM to compensate both amplitude and phase. This proposed system only uses the phase error to generate commands to both DMs. The corrections for both DMs are calculated based on the phase difference between the outgoing and the returned laser beams. The foregoing technique is near optimal only if the distance between the DMs is the same as the optical distance to the strongest turbulent layer.

Hence, it would be desirable to provide methods and systems that are capable of handling adaptive optics using amplitude and phase.

SUMMARY OF THE INVENTION

In one embodiment, an adaptive optics system is provided. The system includes a light source, a pair of deformable mirrors and a detection module. The light source is configured to provide an outgoing beam. The outgoing beam has an amplitude and a phase. The first deformable mirror is configured to reflect the outgoing beam and adjust its associated amplitude. The second deformable mirror is configured to reflect the outgoing beam reflected from the first deformable mirror and adjust its associated phase. The detection module is configured to detect an incoming beam and the reflected outgoing beam from the second deformable mirror and generate certain signals. The signals are used to control the first and second deformable mirrors such that the amplitude of the outgoing beam is the same as that of the incoming beam and the phase of the outgoing beam is opposite that of the incoming beam.

In another embodiment, a system includes dual deformable mirrors that are used to control both amplitude and phase. The system uses intensity error to control the first deformable mirror and phase error to control the second deformable mirror. The system utilizes a calibration routine which measures a number of influence matrices. The influence matrices are then used during normal operation. A first influence matrix relates the command corresponding to the first deformable mirror to the intensity error and the second influence matrix relates the command corresponding to the second deformable to the phase error.

In a further embodiment, an adaptive optics system includes a light source, first and second deformable mirrors, an amplitude controller, a phase controller and a detection module. The light source is configured to provide an outgoing beam. The outgoing beam has an amplitude and a phase. The first deformable mirror is configured to reflect the outgoing beam from the light source. The second deformable mirror is configured to reflect the outgoing beam reflected from the first deformable mirror. The amplitude controller is configured to control the first deformable mirror so as to adjust the amplitude of the outgoing beam. The phase controller is configured to control the second deformable mirror so as to adjust the phase of the outgoing beam. The detection module is configured to obtain intensity and phase information relating to an incoming beam and the outgoing beam reflected from the second deformable mirror and generate corresponding signals usable to control the amplitude and phase controllers. The amplitude of the outgoing beam is adjusted such that it is the same as that of the incoming beam, and the phase of the outgoing beam is adjusted such that it is opposite that of the incoming beam.

In one aspect, a method for managing optical transmissions is provided. An outgoing beam is generated. The outgoing beam has an amplitude and a phase. An incoming beam is received. The incoming beam also has an amplitude and a phase. The respective intensities of the outgoing beam and the incoming beam are compared and an intensity comparison result is generated. The respective phases of the outgoing beam and the incoming beam are also compared and a phase comparison result is generated. The amplitude of the outgoing beam is adjusted based on the intensity comparison result. The amplitude of the outgoing beam is adjusted such that it is the same as that of the incoming beam. The phase of the outgoing beam is adjusted based on the phase comparison result. The phase of the outgoing beam is adjusted such that it is opposite that of the incoming beam.

The present invention may offer a number of benefits and/or advantages. For example, the system produces optimal compensation by measuring both phase and intensity errors and the system is adaptive in that it is not sensitive to both wavelength and incoming intensity profile.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DETAILED DESCRIPTION OF SPECIFIC EMBODIMENTS

Figure 1:
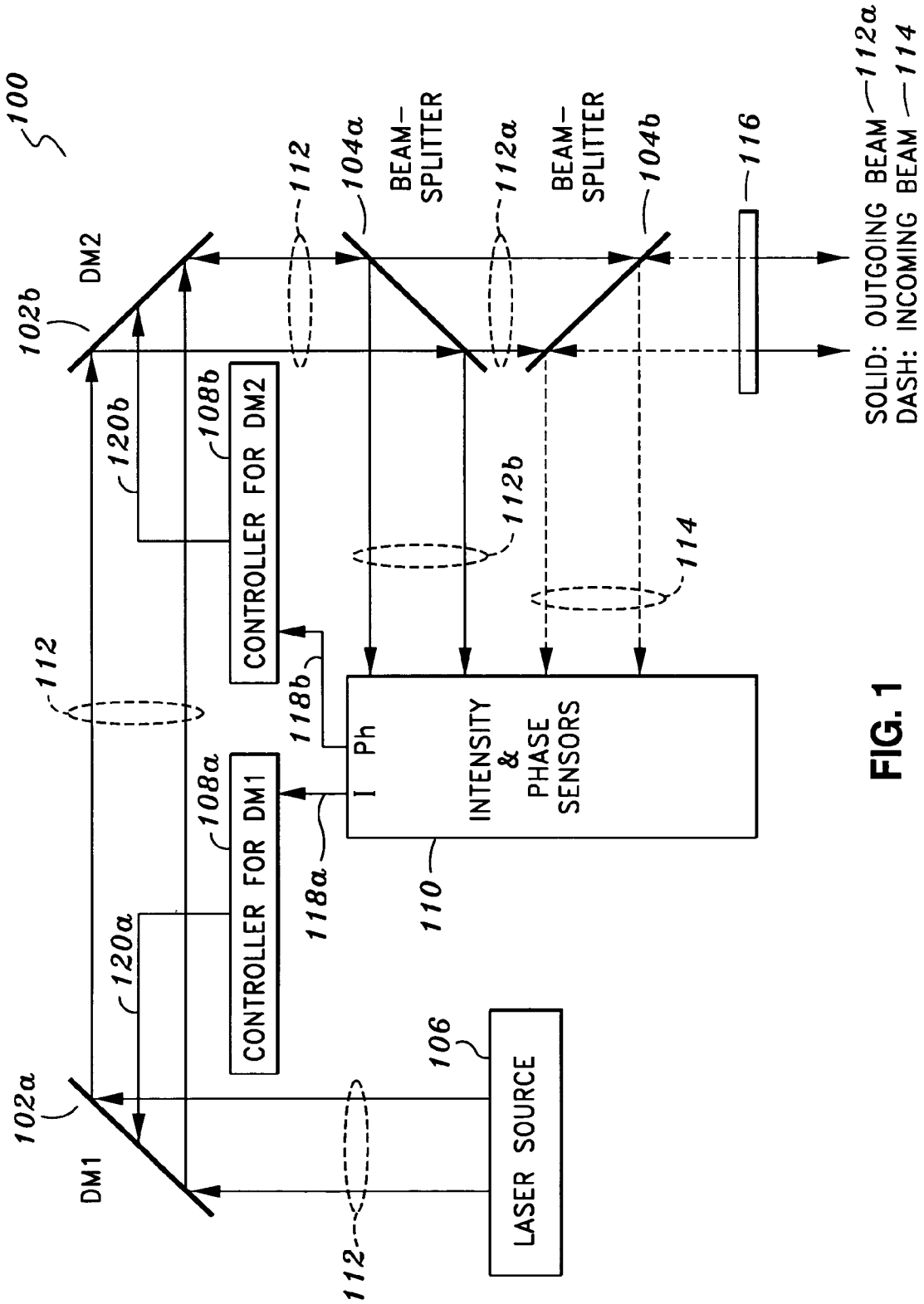
FIG. 1 is a simplified schematic block diagram illustrating one embodiment of the present invention.

One or more embodiments of the present invention will now be described. FIG. 1 illustrates a dual-DM (deformable mirror) system according to one embodiment of the present invention. The system 100 includes a first deformable mirror "DM1" 102a and a second deformable mirror "DM2" 102b, corresponding controllers 108a-b for DM1 102a and DM2 102b, two beam splitters 104a-b, a laser source 106, and a detection module 110 having a number of intensity and phase sensors. It should be understood that actuators (not shown) are used to control the physical movements of DM1 and DM2 102a-b based on the control signals 120a-b provided by the corresponding controllers 108a-b.

As shown in FIG. 1, the system 100 generates an outgoing beam 112a and receives an incoming beam 114. It should be understood that in this particular illustration the outgoing beam 112a and the incoming beam 114 are shown as overlapping each other at the beam exit/entry point 116. With respect to the outgoing beam 112a, the laser source 106 first generates an outgoing beam 112. The outgoing beam 112 is represented by two arrows in this particular illustration. The outgoing beam 112 is then reflected or otherwise diverted by DM1 102a to DM2 102b. It should be noted that DM1 102a can be adjusted by the controller 108a in such a way that the amplitude of the outgoing beam 112 may be varied. DM2 102b, in turn, reflects the outgoing beam 112 to the beam splitter 104a. Similarly, DM2 102b can be adjusted by the controller 108b in such a way that the phase of the outgoing beam may be varied. The beam splitter 104a splits the outgoing beam 112 into outgoing beams 112a-b. Outgoing beam 112b is diverted to the detection module 110 and outgoing beam 112a is diverted to the beam splitter 104b. The beam splitter 104b allows the outgoing beam 112a to exit the system 100 at the beam exit/entry point 116 for a distant destination. It should be noted that outgoing beams 112a-b have the same characteristics. The original outgoing beam 112 is split up by the beam splitter 104a so that information relating to the outgoing beam 112 can be provided to the detection module 110.

With respect to the incoming beam 114, the incoming beam 114 may come from a variety of light sources including, for example, a beacon. The incoming beam 114 is also represented by two arrows in this particular illustration. Characteristics with respect to the incoming beam 114 are known to the system 100 and thus can be used as reference points. The incoming beam 114 is first received by the beam splitter 104b at the beam exit/entry point 116. The beam splitter 104b then diverts the incoming beam 114 to the detection module 110.

As described above, the detection module 110 receives both the outgoing beam 112b and the incoming beam 114. Based on information derived from these beams 112b and 114, the detection module 110 provides the appropriate data and/or signals 118a-b to the DM1 and DM2 controllers 108a-b. The DM1 and DM2 controllers 108a-b, in response, provide the appropriate control signals 120a-b to adjust the DM1 and DM2 102a-b respectively. Operations of the detection module 110 and the controllers 108a-b will be further described below.

The detection module 110 includes a number of sensors for detecting and measuring the intensity and phase of the incoming and outgoing beams 114 and 112b. Intensity and phase information 118a-b is then passed by the detection module 110 onto the controllers 108a-b respectively.

The DM1 controller 108a reads the measured intensities 118a of the incoming and outgoing beams 114 and 112b, calculates the control signals 120a and commands the actuators on DM1 102a. Similarly, the DM2 controller 108b reads the measured phases 118b of the incoming and outgoing beams 114 and 112b, calculates the control signals 120b and commands the actuators on DM2 102b.

For the illustration as shown in FIG. 1, the detection module 110 and the controllers 108a-b are shown as separate components. However, it should be understood that their respective functionality may be effected via one or more components.

The system 100 can be viewed as having two distinct controller loops. The first loop includes an amplitude controller, as represented by the DM1 controller 108a, which measures the intensity error between the outgoing beam 112b and the incoming beam 114 and adjusts the DM1 102a so that the amplitude of the outgoing beam 112a is the same as the amplitude of the incoming beam 114. The second loop includes a phase controller, as represented by the DM2 controller 108b, which controls the phase. The phase controller forces the phase of the outgoing beam 112a to be opposite of that of the incoming beam 114. The amplitude controller loop is dynamically coupled into the phase controller loop in that the amplitude controller loop provides input to the phase controller loop on a dynamic basis.

Figure 2:
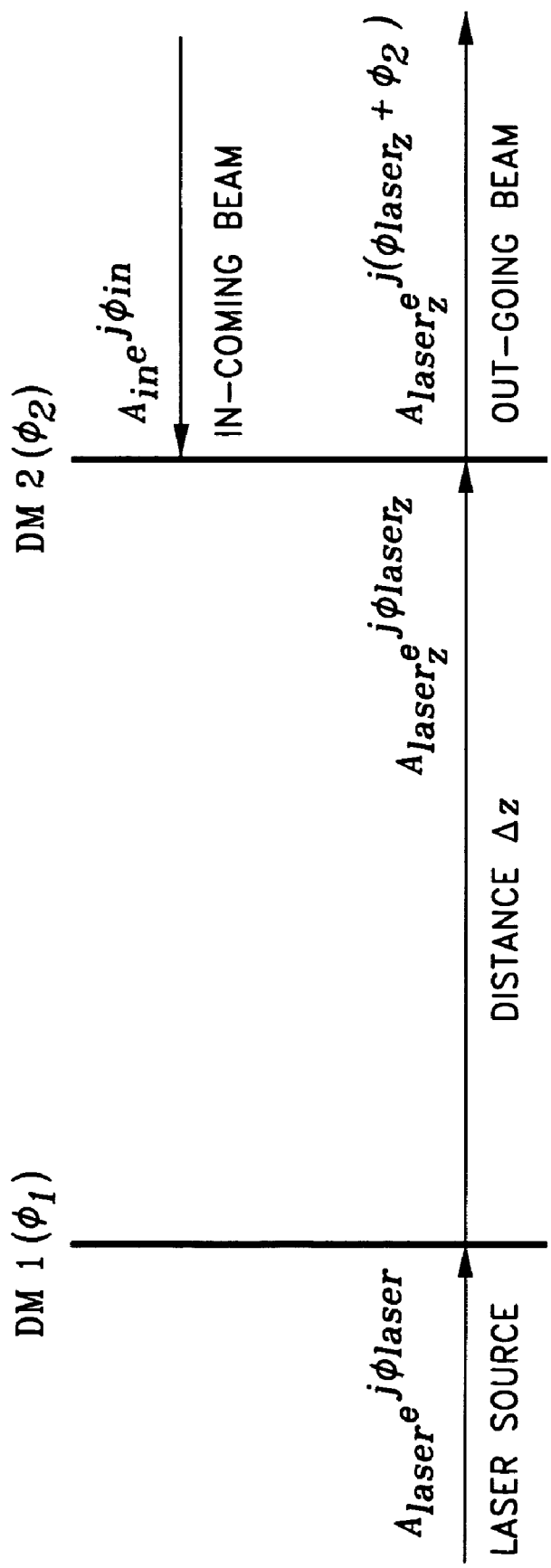
FIG. 2 is an illustrative diagram showing a wavefront controller using dual-DM according to one embodiment of the present invention.

FIG. 2 shows an adaptive wavefront controller using two DMs for generating a field conjugator for the outgoing beam 112a. As mentioned above, there are two distinct controller loops. The first loop is the amplitude controller, which adjusts DM1 102a $\phi_1$ so that the outgoing beam amplitude $A_{laser_z}$ is the same as the incoming beam amplitude $A_{in}$. The second loop is the phase controller. DM2 102b controls the phase. DM2 102b adjusts $\phi_2$ so that the outgoing beam phase $\phi_{out} = \phi_{laser_z} + \phi_2$ is the conjugate of the incoming beam phase $\phi_{in}$.

The amplitude controller performs the mapping from DM1 actuator commands to DM2 intensity. This can be obtained from either a calibration routine or an intensity transport equation, which relates the phase to the intensity. The inverse mapping is used in the closed loop amplitude controller operation, which measures intensity and produces the DM1 actuator commands. The amplitude controller performs the phase-to-intensity mapping so that it can control the intensity by adjusting the DM phase. The intensity transport equation (ITE) relates the intensity I in the propagation direction z to the wavefront curvature $\phi$ and is as follows:

$$-k\frac{dI}{dz} = \nabla^2(I\phi)$$

where $$k = \frac{2\pi}{\lambda}$$

and $\lambda$ is the wavelength

If the wavefront is reconstructed in the region of uniform intensity $I_0$, then the ITE becomes:

$$-\frac{k}{I_0}\frac{dI}{dz} = \nabla^2 \phi$$

For a small propagation distance and a small sub-aperture size, the ITE becomes $$-\frac{k}{I_0}\frac{I-I_0}{\Delta z} = \frac{\phi(x+\Delta x)-2\phi(x)+\phi(x-\Delta x)}{\Delta x^2} + \frac{\phi(y+\Delta y)-2\phi(y)+\phi(y-\Delta y)}{\Delta y^2}$$

Where:
$\Delta z$ is the distance from DM1 to DM2
$\Delta x, \Delta y$ are the sides of the square sub-aperture for DM1
$I$ is the intensity at DM2
$\phi$ is the phase at DM1

For the N by N actuators, the non-edge equation for the actuator at row m and column n is given by:

$$I(m,n) = I_0 - \frac{I_0 \Delta z}{k \Delta x^2}(4\phi(m,n) - \phi(m-1,n) - \phi(m+1,n) - \phi(m,n-1) - \phi(m,n+1))$$

The above equation gives the intensity at DM2 102b based on the phase at DM1 102a. The inverse relationship can be used to calculate the required phase on DM1 102a from the desired intensity at DM2 102b. However, the technique is sensitive to the parameter variations and the alignment between DMs. In addition, it does not take the DM influence function into consideration. In order to overcome the described uncertainties, the phase-to-intensity mapping can be obtained by sequentially poking each actuator of DM1 102a with command u(m,n) and recording the intensity values at DM2 102b. The poke matrix will then be the difference between the measured and the reference intensities. In this case, the reference intensity is the measured intensity with the zero phase at DM1 102a.

$$\begin{vmatrix} I(1,1) \\ I(1,2) \\ \vdots \\ I(N,N) \end{vmatrix} = H_{iPoke} \begin{vmatrix} u(1,1) \\ u(1,2) \\ \vdots \\ u(N,N) \end{vmatrix}$$

The intensity poke matrix $H_{iPoke}$ has the dimension of $N^2$ by $N^2$

Another constraint for the phase-to-intensity mapping is that the distance between DMs must be small.

$$\Delta z = a \frac{\Delta x^2}{\lambda}$$

Where:
a is constant

For a given desired intensity, the required phase at DM1 102a is inversely proportional to the distance $\Delta z$. If the constant a is less than 1, then the required dynamic range for DM1 102a is large. If the constant a is much bigger than 1, then the geometric optic ITE equation is no longer valid. The poke matrix $H_{iPoke}$ is still valid. However, the coupling among actuators is very strong and the system might become difficult to control.

In one embodiment, the amplitude controller includes two parts: calibration and controller algorithms. The calibration algorithm includes a series of steps. The first calibration step measures the reference intensity. The second step obtains the poke matrix. It sequentially pokes each actuator with a given poke value and measures the intensity at DM2 102b. The poke value is selected so the measurement is not sensitive to noise and the phase-to-intensity relationship is still linear. The poke matrix $H_{iPoke}$ will then be the difference between the measured and the reference intensities.

During normal operation, the amplitude controller executes the same set of equations every controller sampling time interval. The pseudo-algorithm followed by the amplitude controller is given below:

Start
Measure the incoming beacon intensity: $I_{in}$
Normalize to the Gaussian source energy:

$$I_{in2} = I_{in} \frac{\sum I_{gauss_{mn}}}{\sum I_{in_{mn}}}$$

Add it into the Gaussian source: $I_{in3} = k_{weight} I_{in2} + I_{gauss}$
Again, normalize to the Gaussian source energy:

$$I_{desired} = I_{in3} \frac{\sum I_{gauss_{mn}}}{\sum I_{in3_{mn}}}$$

Measure the outgoing intensity after DM2: $I_{DM2}$
Calculate the intensity error: $I_{err} = I_{desired} - I_{DM2}$
Map the intensity error to the command error: $u_{err} = H_{iPoke}^{-1} I_{err}$
Integrate the command error to generate the DM1 control signal $$u_{DM1_{mn}}(k_T) = u_{DM1_{mn}}(k_T - 1) + k_i u_{err_{mn}}$$

Error checking and command saturation
End

The above pseudo-algorithm dynamically generates the desired intensity pattern and commands the DM actuators so that the outgoing beam intensity after DM2 102b approaches the desired value. The first four-steps modulate the incoming beam with the Gaussian source to produce the desired intensity pattern. It also ensures that the energy is conserved between the desired and the source intensities. The weighting factor $k_{weight}$ in step 3 is a designed constant. Generally, the weighting factor is equal to 1 but it could be less than 1 for partial amplitude compensation. The next four steps compare the outgoing beam intensity with the desired values, map the intensity error to the command error and calculate the actuator control signals. In the controller equation, $k_T$ is the sampling index and incremented by one for every controller interval. The integrator gain $k_i$ relates to the controller bandwidth. The higher $k_i$ will speed up the system response but it must be less than 1 for a stable system. Lastly, the pseudo-algorithm checks for the intensity error and saturates the command signals according to the bounded dynamic range.

The above pseudo-algorithm can be extended to include the phase controller, which is as follows:

Start
Amplitude Controller Algorithm
Phase Controller Algorithm
    Measure the phase of the incoming beam: $\phi_{in}$
    Measure the phase of the outgoing beam after DM2: $\phi_{out}$
    Calculate the phase error: $\phi_{err2}=-\phi_{in}-\phi_{out}$
    Map the phase error to the DM command error: $u_{err2}=H_{\phi Poke}^{-1}\phi_{err2}$
    Integrate the command error to generate the DM2 control signal $$u_{DM2_{mn}}(k_T)=u_{DM2_{mn}}(k_T-1)+k_i u_{err2_{mn}}$$

Error checking and command saturation for DM2
End

The phase controller requires the phase poke matrix $H_{\phi Poke}$. This was also obtained during calibration by sequentially poking DM2 102b and measuring the output phase.

$$\begin{vmatrix} \phi(1,1) \\ \phi(1,2) \\ \vdots \\ \phi(N,N) \end{vmatrix} = H_{\phi Poke} \begin{vmatrix} u(1,1) \\ u(1,2) \\ \vdots \\ u(N,N) \end{vmatrix}$$

Similarly, the phase controller performs the mapping from DM2 actuator commands to DM2 phase. The inverse mapping is used in the phase controller, which measures the phase difference between the outgoing and incoming beams 112a and 114 and produces the DM2 actuator commands.

For a very strong scintillated condition, the dual-DM system as described above can only provide partial amplitude compensation because the DM1 may not have sufficient dynamic range to cover the entire intensity variation. In that case, a tri-DM system can be used. In one embodiment, two deformable mirrors DM1 and DM2 collectively compensate for the amplitude and a third deformable mirror DM3 compensates for the phase. The pseudo-algorithm for such a system is as follows:

Start
Measure the incoming beacon intensity: $I_{in}$
Normalize to the Gaussian source energy:

$$I_{in2} = I_{in} \frac{\sum I_{gauss_{mn}}}{\sum I_{in_{mn}}}$$

Add it into the Gaussian source: $I_{in3}=0.5 I_{in2}+I_{gauss}$
$I_{in4}=I_{in2}+I_{gauss}$
Again, normalize to the Gaussian source energy:

$$I_{desired1} = I_{in3} \frac{\sum I_{gauss_{mn}}}{\sum I_{in3_{mn}}}$$

$$I_{desired2} = I_{in4} \frac{\sum I_{gauss_{mn}}}{\sum I_{in4_{mn}}}$$

Measure the outgoing intensity after DM2: $I_{DM2}$
Calculate the intensity error after DM2: $I_{err1}=I_{desired1}-I_{DM2}$
Map the intensity error to the command error: $u_{err1}=H_{iPoke}^{-1}I_{err1}$
Integrate the command error to generate the DM1 control signal $$u_{DM1_{mn}}(k_T)=u_{DM1_{mn}}(k_T-1)+k_i u_{err_{mn}}$$

Error checking and command saturation for DM1
Measure the outgoing intensity after DM3: $I_{DM3}$
Calculate the intensity error after DM3: $I_{err2}=I_{desired2}-I_{DM3}$
Map the intensity error to the command error: $u_{err2}=H_{iPoke}^{-1}I_{err2}$
Integrate the command error to generate the DM2 control signal $$u_{2_{mn}}(k_T)=u_{2_{mn}}(k_T-1)+k_i u_{err_{mn}}$$

$$u_{DM2_{mn}}(k_T)=u_{2_{mn}}(k_T)-u_{DM1_{mn}}(k_T)$$

Error checking and command saturation for DM2
Measure the phase of the incoming beam: $\phi_{in}$
Measure the phase of the outgoing beam after DM3: $\phi_{out}$
Calculate the phase error: $\phi_{err3}=-\phi_{in}-\phi_{out}$
Map the phase error to the DM command error: $u_{err3}=H_{iPoke}^{-1}\phi_{err3}$
Integrate the command error to generate the DM3 control signal $$u_{DM3_{mn}}(k_T)=i_{DM3_{mn}}(k_T-1)+k_i u_{err3_{mn}}$$

Error checking and command saturation for DM3
End

The pseudo-algorithm for the tri-DM system is similar to that of the dual-DM system except that the desired intensities for the amplitude controllers are slightly different. The desired intensities $I_{desired1}$ and $I_{desired2}$ are generated using $k_{weight}$ of 0.5 and 1 respectively. So each amplitude controller compensates for 50% of the intensity variation. The tri-DM uses two terms in forming the DM2 actuator control signal. Similar to the dual-DM algorithm, the first term is calculated from the intensity error, which is the difference between $I_{desired2}$ and the measured intensity after DM3. The second term is the feed-forward from the DM1 command so that it can negate the wavefront phase producing by DM1. While the foregoing pseudo-algorithm is suitable for the tri-DM system, it should be understood that it can be extended for systems with more than three DMs. The last DM does the phase compensation and the other DMs do the amplitude compensation. Similarly, the desired intensities are generated using various $k_{weight}$ and each actuator command is fed-forward to the next amplitude controller.

Performance of the dual-DM system as described above is compared to that of a typical system. The dual-DM system uses the incoming beam to precondition the outgoing beam by controlling the deformable mirror phase sheet. Let the incoming beam wavefront be:

$$y_{in}=A_{in}e^{j\phi_{in}}$$

The typical system conjugates the phase and produces the outgoing beam wavefront as follows:

$$y_{out}=A_{out}e^{-j\phi_{in}}$$

The amplitude $A_{out}$ depends on the laser source intensity profile. It has either Gaussian or top-hat distribution. For the dual-DM system, the second DM modifies the laser source profile so that the outgoing beam amplitude is also the same as the incoming beam amplitude such that $y_{out}=A_{in}e^{-j\Phi_{in}}$.

Figure 3:
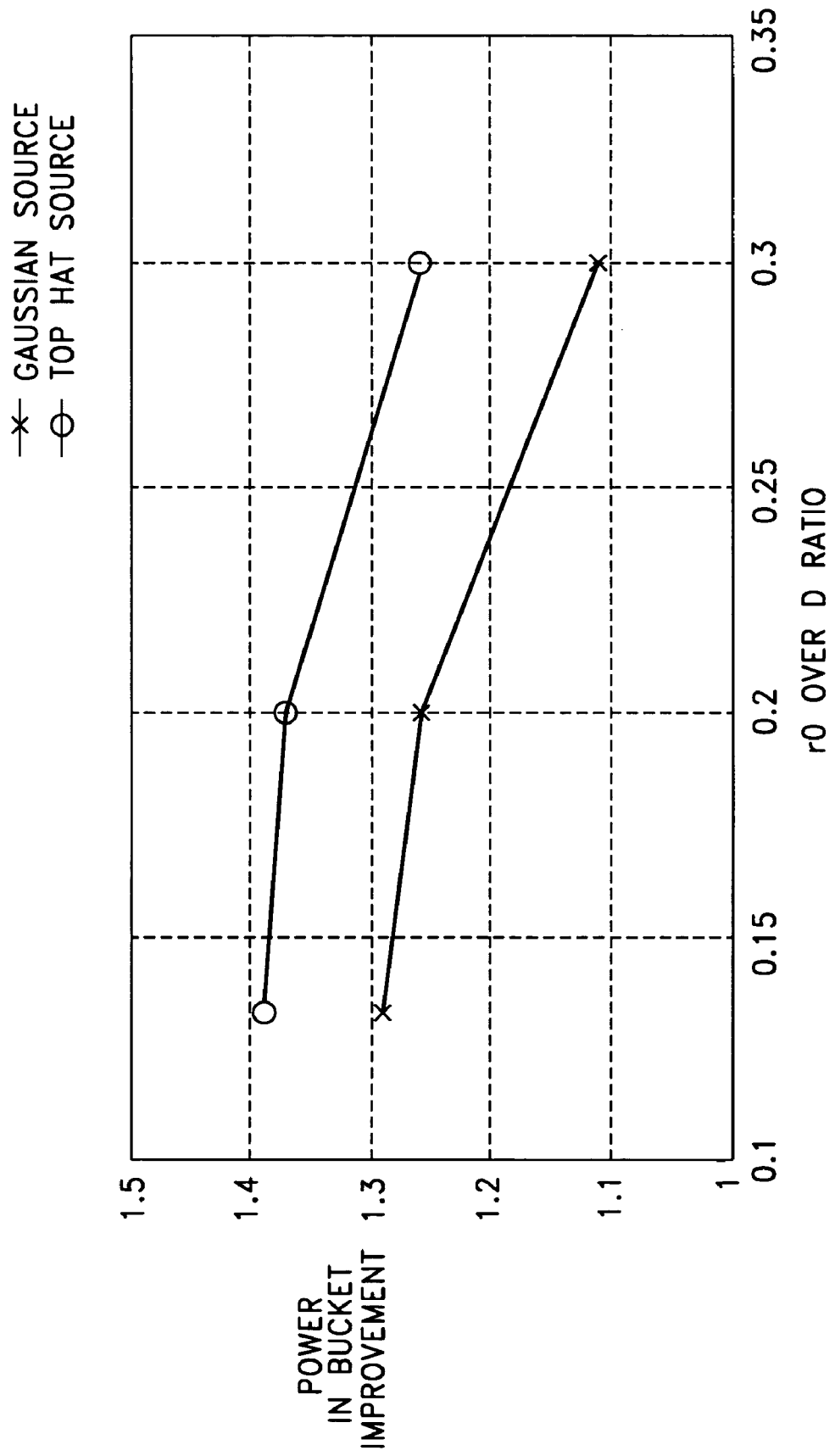
FIG. 3 is an illustrative diagram showing a power-in-bucket improvement comparison.

FIG. 3 shows the PIB (Power in Bucket) improvement between the dual-DM system that uses both amplitude and phase and a typical system that uses only phase. The horizontal axis is the ratio of the turbulent strength $r_0$ over the receiver diameter. The smaller value of $r_0$ corresponds to a stronger turbulence. As expected, the benefit from the amplitude controller is higher for a stronger scintillated condition. They are 30% and 40% for Gaussian and top-hat laser sources respectively. The improvement, from the Gaussian beam, is slightly lower compared to the top-hat beam because its energy is more concentrated at the center and is less sensitive to the turbulence.

The following are some simulation results.

| A laser-com scenario: | |
| --- | --- |
| Propagation length | L = 4 km |
| Wavelength | λ = 1.55 μm |
| Receiver aperture diameter | D = 0.1 m |
| Refractive index structure constant | $C_n^2 = 5 \times 10^{-14}$ |
| Turbulence strength | $r_0$ = 0.013 m |

Figure 4:
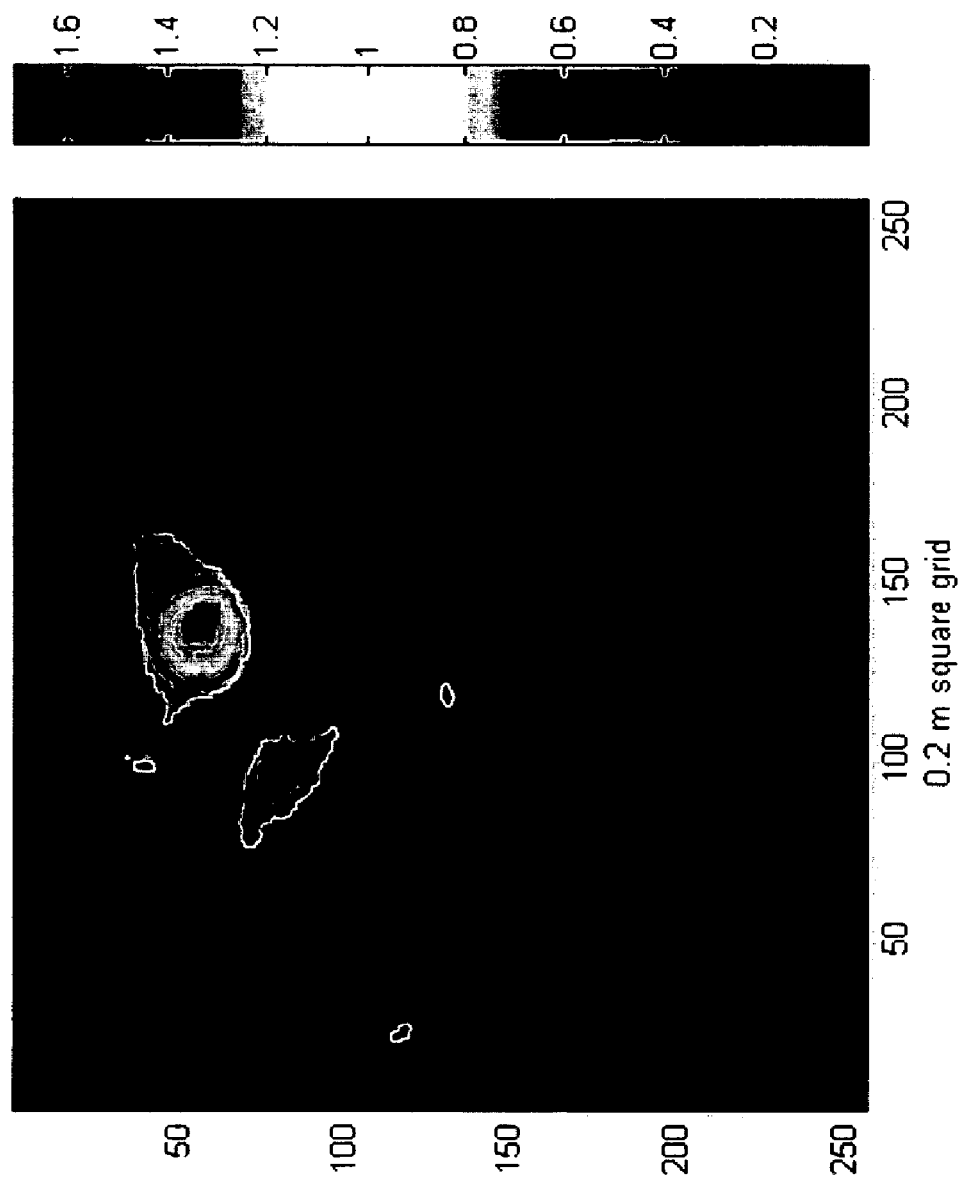
FIG. 4 is an illustrative diagram showing an incoming beam intensity.
Figure 5:
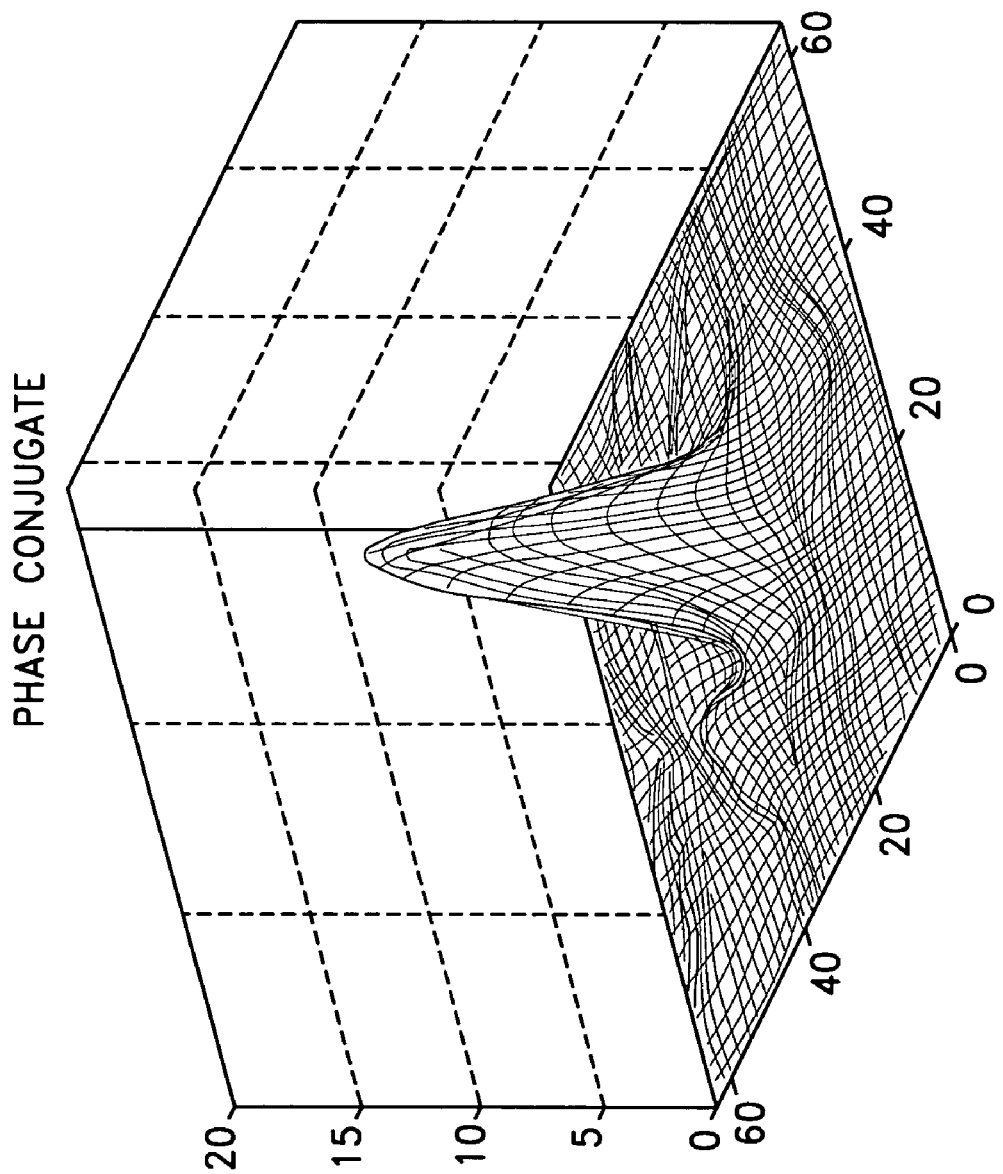
FIGS. 5-9 are various graphs illustrating simulation results of various embodiments of the present invention.
Figure 6:
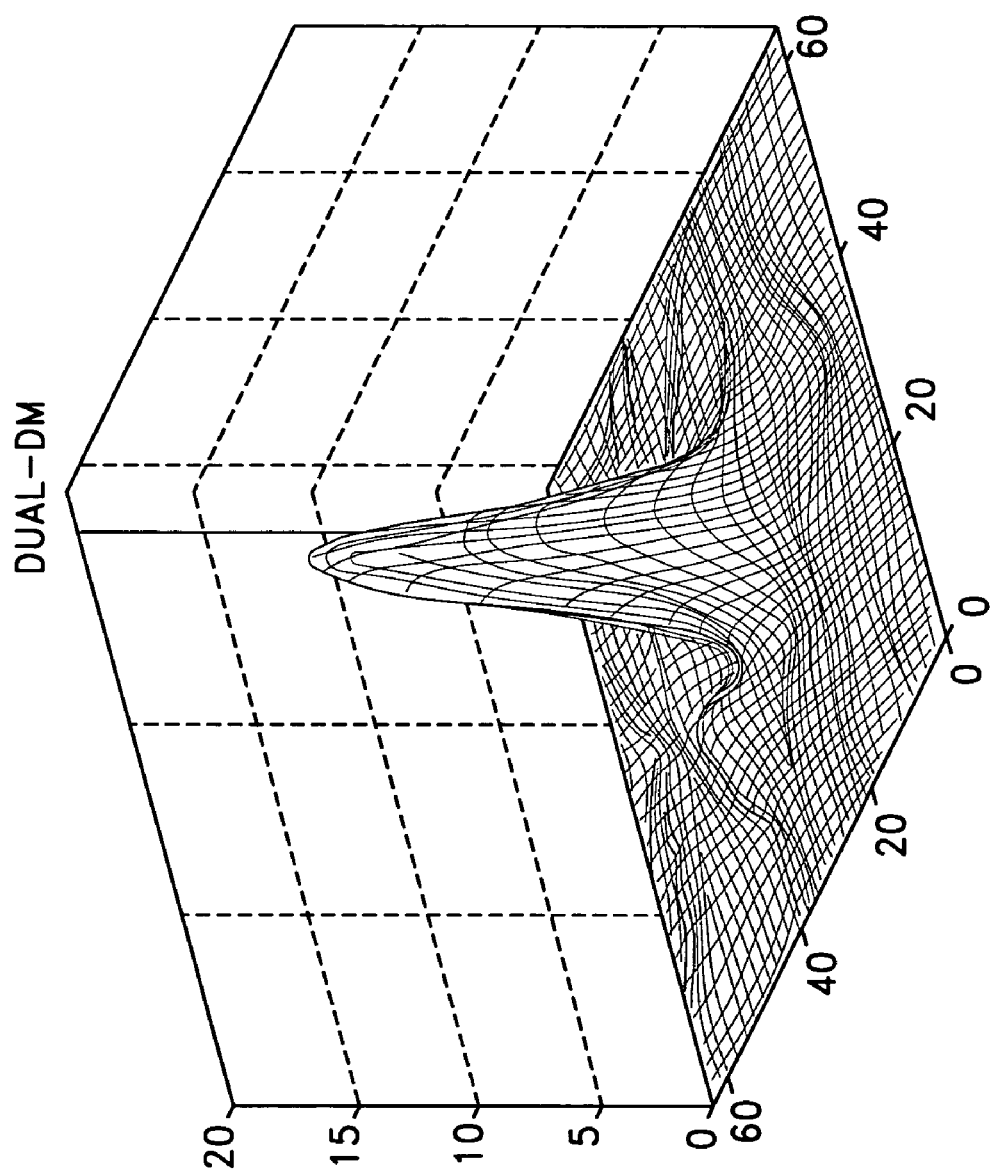
Figure 7:
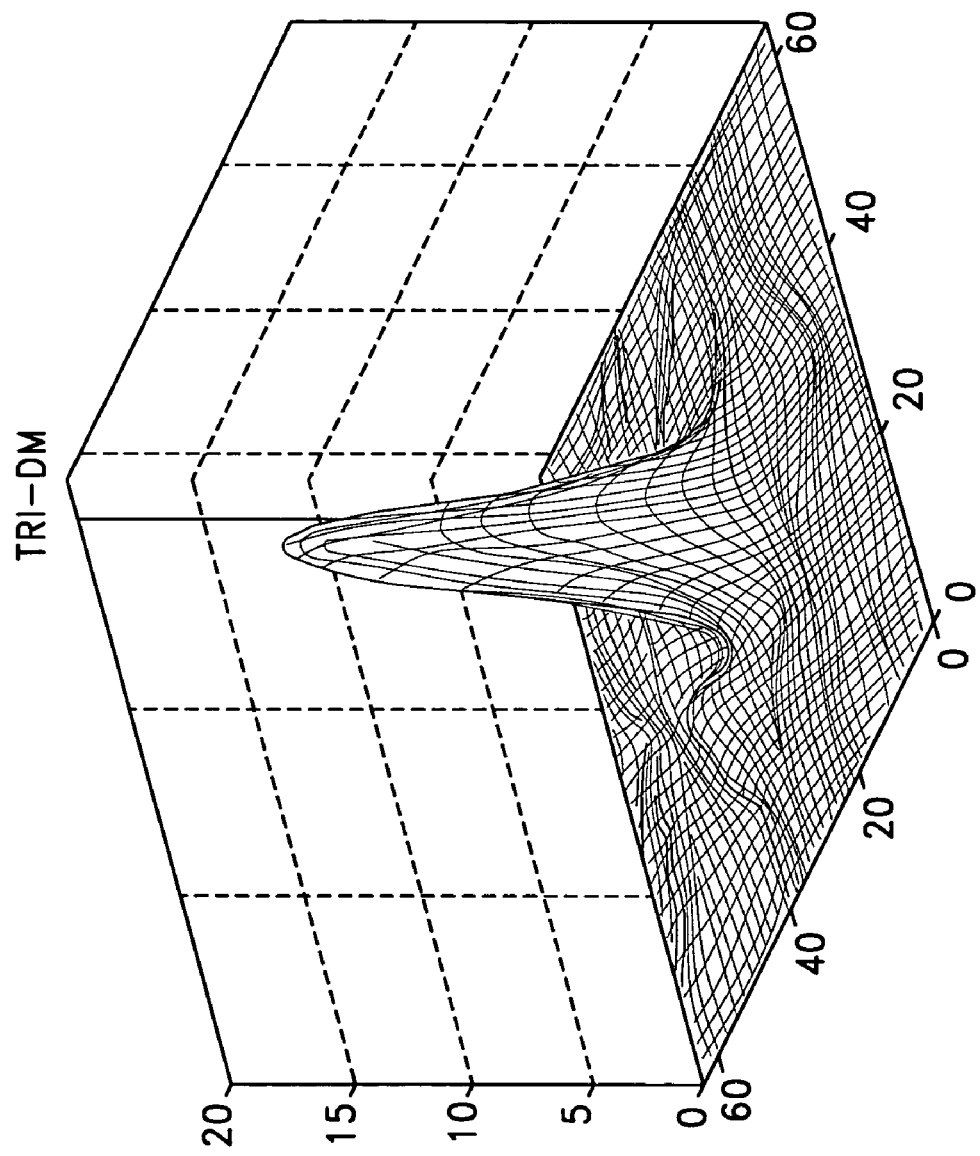
Figure 8:
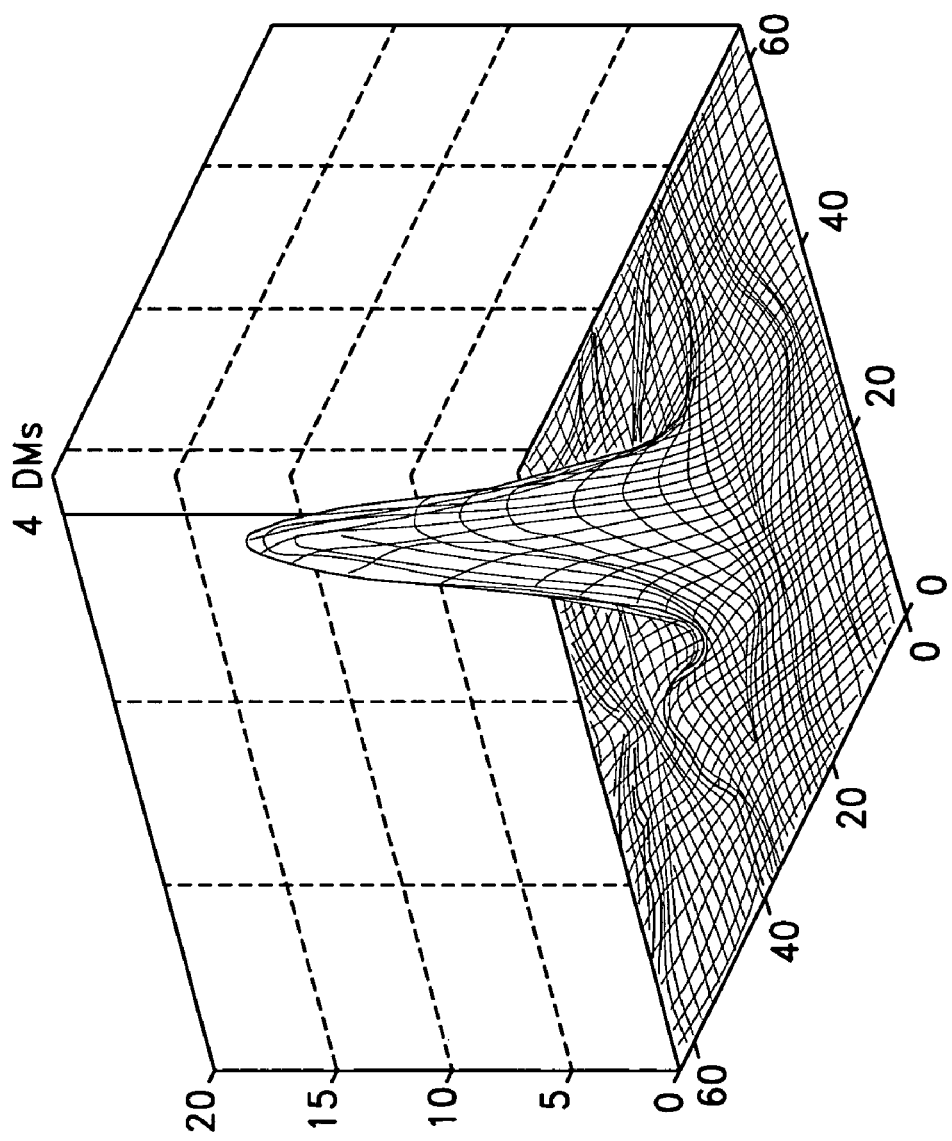
Figure 9:
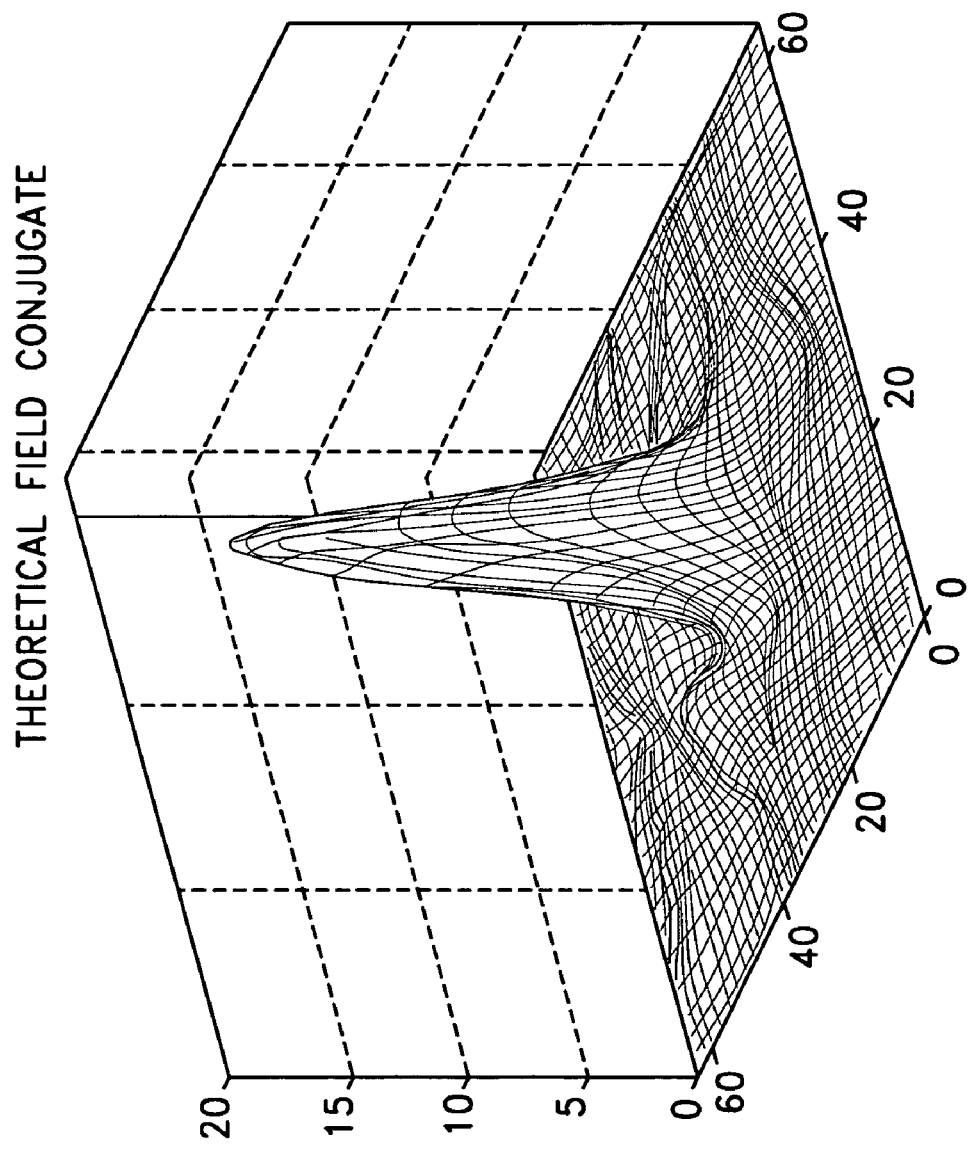

The adaptive optics for laser-com works with the various turbulence conditions in which $r_0/D$ is greater than 0.1. The above scenario has the $r_0/D$ of 0.13, which is closed to the worst case condition. FIG. 4 shows the incoming intensity pattern after propagated through the atmosphere. The beam is aberrated and 10% of its energy resides outside of the 0.1 m receiver aperture. The typical system senses the incoming beam intensity and transmits the outgoing beam with the conjugated phase from the measured beam. The amplitude is the same as the laser source amplitude, which has a typical Gaussian profile. The outgoing beam propagates to the target focal plane and the result is shown in FIG. 5. For the dual-DM system, the Gaussian source is modulated with the measured incoming intensity before transmitting. As shown in FIG. 6, its PIB is 15% higher compared to the typical system. Although the improvement is good, but it is still less than 29%, which is the theoretical field conjugator performance. The main reason is the constraint distance between DMs, which limits the dynamic range of the dual-DM system. It only partially compensates for the intensity variation of the very aberrated beam. In this case, the PIB can be further improved by using an additional DM as described above. The results are shown in FIGS. 7 and 8 for tri-DM and quad-DM systems respectively. The PIB improvements are 22% and 25% respectively.

In one embodiment, the present invention is implemented using a combination of hardware and software in the form of control logic. The software may reside on a computer-readable medium executable by a computer or other types of computing devices. Based on the disclosure and teachings provided herein, a person of ordinary skill in the art will know of other ways and/or methods to implement the present invention.

The present invention can be deployed in various applications. For example, in one application, the present invention can be used in a laser optical communication system. Based on the disclosure and teachings provided herein, a person of ordinary skill in the art will appreciate how to deploy the present invention in other applications. For example, the amplitude controller can lead to many applications in beam shaping. One illustrative application is an imaging system for a very high contrast condition which requires a strong reduction of the wings of the Point-Spread Function (PSF). The coronagraphic technique, or the phase-induced amplitude apodization (PIAA), can be used for the described application. The coronagraphy includes the classical pupil apodization to reduce the amplitude of the PSF wings. Unfortunately, this technique reduces a very large portion of the receiving energy. The PIAA as suggested by one conventional system uses two pre-shaped mirrors for modifying the incoming beam to certain shaping, which produces a desired PSF. The first mirror shapes the amplitude and the second mirror cleans up the phase. Geometric optics can be used to calculate the required shapes assuming that the receiver wavelength, phase and amplitude are prior-knowledge. If those parameters are varied during imaging then the PSF, produced by the PIAA technique, does not meet the requirement. The present invention can be adapted to create an adaptive system using the deformable mirrors for beam shaping. The first DM modifies the incoming beam to the Gaussian distribution and the second DM cleans up the output phase. The Gaussian beam with zero curvature produces a Gaussian PSF, which has very small wing amplitude. Another workable solution is using two pre-shaped mirrors at the front end and then following them with two DMs. The pre-shaped mirror is for the coarse adjustment and the DM is for the fine adjustment. This would significantly minimize the required DM dynamic range.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An adaptive optics system comprising:
    a light source configured to provide an outgoing beam, the outgoing beam having an amplitude and a phase associated therewith;
    a first deformable mirror configured to reflect the outgoing beam and adjust its associated amplitude;
    a second deformable mirror configured to reflect the outgoing beam reflected from the first deformable mirror and adjust its associated phase; and
    a detection module configured to detect an incoming beam and the reflected outgoing beam from the second deformable mirror and generate corresponding signals usable to control the first and second deformable mirrors;
    wherein the signals are used respectively to control the first and second deformable mirrors such that the amplitude of the outgoing beam is the same as that of the incoming beam and the phase of the outgoing beam is opposite that of the incoming beam.

2. The system of claim 1 wherein the detection module further includes a plurality of intensity sensors and a plurality of phase sensors.

3. The system of claim 2 wherein the plurality of intensity sensors are configured to measure an intensity error between the outgoing beam and the incoming beam;
    wherein the plurality of phase sensors are configured to measure a phase difference between the outgoing beam and the incoming beam; and wherein the intensity error and the phase difference are used to generate the corresponding signals usable to control the first and second deformable mirrors.

4. The system of claim 1 wherein the incoming beam is originated from a beacon with known optical characteristics.

5. The system of claim 1 further comprising:
a beam splitter configured to receive and split the reflected outgoing beam from the second deformable mirror into first and second split versions of the outgoing beam; and
wherein the first split version is diverted to the detection module and the second split version is directed to a distant destination.

6. A laser communication system incorporating the system as recited in claim 1.

7. An adaptive optics system comprising:
a light source configured to provide an outgoing beam, the outgoing beam having an amplitude and a phase associated therewith;
a first deformable mirror configured to reflect the outgoing beam from the light source;
a second deformable mirror configured to reflect the outgoing beam reflected from the first deformable mirror;
an amplitude controller configured to control the first deformable mirror so as to adjust the amplitude of the outgoing beam;
a phase controller configured to control the second deformable mirror so as to adjust the phase of the outgoing beam;
a detection module configured to obtain intensity and phase information relating to an incoming beam and the outgoing beam reflected from the second deformable mirror and generate corresponding signals usable to control the amplitude and phase controllers;
wherein the amplitude of the outgoing beam is adjusted such that it is the same as that of the incoming beam; and
wherein the phase of the outgoing beam is adjusted such that it is opposite that of the incoming beam.

8. The system of claim 7 wherein the detection module further includes a plurality of intensity sensors and a plurality of phase sensors.

9. The system of claim 8 wherein the plurality of intensity sensors are configured to measure an intensity error between the outgoing beam and the incoming beam;
wherein the plurality of phase sensors are configured to measure a phase difference between the outgoing beam and the incoming beam; and
wherein the intensity error and the phase difference are used to generate the corresponding signals usable to control the first and second deformable mirrors.

10. The system of claim 7 wherein the incoming beam is originated from a beacon with known optical characteristics.

11. The system of claim 7 further comprising:
a beam splitter configured to receive and split the reflected outgoing beam from the second deformable mirror into first and second split versions of the outgoing beam; and
wherein the first split version is directed to the detection module and the second split version is directed to a distant destination.

12. A laser communication system incorporating the system as recited in claim 7.

13. An adaptive optics system comprising:
a light source configured to provide an outgoing beam, the outgoing beam having an amplitude and a phase associated therewith;
a plurality of deformable mirrors;
an amplitude controller configured to control one of the plurality of deformable mirrors to effect amplitude adjustment on the outgoing beam;
a phase controller configured to control one of the plurality of deformable mirrors to effect phase adjustment on the outgoing beam;
a detection module configured to obtain intensity and phase information relating to an incoming beam and the outgoing beam and generate corresponding signals usable to control the amplitude and phase controllers;
wherein the amplitude of the outgoing beam is adjusted such that it is the same as that of the incoming beam; and
wherein the phase of the outgoing beam is adjusted such that it is opposite that of the incoming beam.

14. The system of claim 13,
wherein a first deformable mirror of the plurality of deformable mirrors is configured to reflect the outgoing beam provided by the light source; and
wherein a second deformable mirror of the plurality of deformable mirrors is configured to reflect the outgoing beam reflected from the first deformable mirror;
wherein the outgoing beam reflected from the second deformable mirror is directed to the detection module;
wherein the amplitude controller is further configured to control the first deformable mirror so as to effect the amplitude adjustment on the outgoing beam; and
wherein the phase controller is further configured to control the second deformable mirror so as to effect the phase adjustment on the outgoing beam.

15. The system of claim 14 further comprising:
a beam splitter configured to receive and split the reflected outgoing beam from the second deformable mirror into first and second split versions of the outgoing beam; and
wherein the first split version is directed to the detection module and the second split version is directed to a distant destination.

16. The system of claim 13 wherein the detection module further includes a plurality of intensity sensors and a plurality of phase sensors.

17. The system of claim 13 wherein the plurality of intensity sensors are configured to measure an intensity error between the outgoing beam and the incoming beam;
wherein the plurality of phase sensors are configured to measure a phase difference between the outgoing beam and the incoming beam; and
wherein the intensity error and the phase difference are used to generate the corresponding signals usable to control the amplitude and phase controllers.

18. The system of claim 13
wherein the amplitude controller is further configured to control two or more of the plurality of deformable mirrors to effect the amplitude adjustment of the outgoing beam.

19. The system of claim 13 wherein the incoming beam is originated from a beacon with known optical characteristics.

20. A laser communication system incorporating the system as recited in claim 13.

21. A method for managing optical transmissions using a plurality of deformable mirrors, the method comprising:
generating an outgoing beam, the outgoing beam having an amplitude and a phase;
receiving an incoming beam, the incoming beam having an amplitude and a phase;
comparing the respective intensities of the outgoing beam and the incoming beam and generating an intensity comparison result;

comparing the respective phases of the outgoing beam and the incoming beam and generating a phase comparison result;

adjusting a first deformable mirror based on the intensity comparison result so as to effect amplitude adjustment on the outgoing beam, wherein the amplitude of the outgoing beam is adjusted such that it is the same as that of the incoming beam; and adjusting a second deformable mirror based on the phase comparison result so as to effect phase adjustment on the outgoing beam, wherein the phase of the outgoing beam is adjusted such that it is opposite that of the incoming beam.

* * * * *

UNITED STATES PATENT AND TRADEMARK OFFICE
CERTIFICATE OF CORRECTION

PATENT NO. : 7,397,018 B1
APPLICATION NO. : 11/068754
DATED : July 8, 2008
INVENTOR(S) : Ich V. Pham et al.

It is certified that error appears in the above-identified patent and that said Letters Patent is hereby corrected as shown below:

IN THE SPECIFICATION:

In Column 6, line 33: " $I_{in3} - k_{weight}I_{in2} + I_{gauss}$ " should read -- $I_{in3} = k_{weight}I_{in2} + I_{gauss}$ --

In Column 6, line 44: " $u_{err} - H_{iPoke}^{-1}I_{err}$ " should read -- $u_{err} = H_{iPoke}^{-1}I_{err}$ --

In Column 7, line 15: " $u_{err2} = H_{\phi Poke}^{-1}\phi_{err2}$ " should read -- $u_{err2} = H_{\phi Poke}^{-1}\phi_{err2}$ --

In Column 8, line 10: " $u_{err1} = H_{iPoke}^{-1}I_{err1}$ " should read -- $u_{err1} = H_{iPoke}^{-1}I_{err1}$ --

In Column 8, line 19: " $u_{err2} = H_{iPoke}^{-1}I_{err2}$ " should read -- $u_{err2} = H_{iPoke}^{-1}I_{err2}$ --

In Column 8, line 22: " $u_{2_{mn}}(k_T) - u_{2_{mn}}(k_T - 1) + k_i u_{err_{mn}}$ " should read -- $u_{2_{mn}}(k_T) - u_{2_{mn}}(k_T - 1) + k_i u_{err2_{mn}}$ --

In Column 8, line 30: " $u_{err3} - H_{iPoke}^{-1}\phi_{err3}$ " should read -- $u_{err3} = H_{\phi Poke}^{-1}\phi_{err3}$ --

Signed and Sealed this

Eleventh Day of November, 2008

JON W. DUDAS
*Director of the United States Patent and Trademark Office*